United States Patent
Goodman et al.

(10) Patent No.: US 7,586,422 B2
(45) Date of Patent: Sep. 8, 2009

(54) DETERMINATION OF RUNWAY LANDING CONDITIONS

(75) Inventors: William L. Goodman, Coupeville, WA (US); Thomas Imrich, Mercer Island, WA (US); Syed T. Shafaat, Everett, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 11/461,880

(22) Filed: Aug. 2, 2006

(65) Prior Publication Data

US 2008/0030073 A1 Feb. 7, 2008

(51) Int. Cl.
G08B 21/00 (2006.01)

(52) U.S. Cl. .................... 340/945; 340/971

(58) Field of Classification Search .......... 340/971, 340/945
See application file for complete search history.

(56) References Cited

U.S. PATENT DOCUMENTS

| | | | |
|---|---|---|---|
| 5,050,940 A * | 9/1991 | Bedford et al. ............ 303/166 |
| 5,541,591 A | 7/1996 | Bush |
| 5,574,644 A | 11/1996 | Butsuen et al. |
| 5,636,123 A | 6/1997 | Rich et al. |
| 5,774,070 A * | 6/1998 | Rendon ..................... 340/905 |
| 5,968,106 A | 10/1999 | DeVlieg et al. |
| 6,278,965 B1 * | 8/2001 | Glass et al. ................. 703/22 |
| 6,338,011 B1 | 1/2002 | Furst et al. |
| 6,381,538 B1 * | 4/2002 | Robinson et al. ........... 701/211 |
| 6,469,660 B1 | 10/2002 | Horvath et al. |
| 6,650,972 B1 | 11/2003 | Robinson et al. |
| 6,917,860 B1 | 7/2005 | Robinson et al. |
| 6,952,631 B2 | 10/2005 | Griffith et al. |
| 6,991,304 B2 | 1/2006 | Villaume |
| 2004/0107027 A1 * | 6/2004 | Boudrieau .................... 701/1 |
| 2004/0177671 A1 * | 9/2004 | Hurson ........................ 73/9 |
| 2006/0144997 A1 | 7/2006 | Schmidt et al. |
| 2006/0243857 A1 * | 11/2006 | Rado ......................... 244/111 |
| 2007/0250224 A1 | 10/2007 | Dwyer |

OTHER PUBLICATIONS

Transport Canada—Overview of the Joint Winter Runway Friction Measurement Program, Nov. 2004 (http://www.tc.gc.ca/TDC/publication/tp13361e/menu.htm).*

Internet Archive—Canadian Runway Friction Index—Table 1 -CRFI Recommended Landing Distances—Apr. 18, 2003, (http://web.archive.org/web/20030418010005/http://www.tc.gc.ca/CivilAviation/commerce/OperationalStandards/CRFI/Table1.htm).*

(Continued)

*Primary Examiner*—Toan N Pham
*Assistant Examiner*—Kerri L McNally
(74) *Attorney, Agent, or Firm*—Rozenblat IP LLC

(57) ABSTRACT

The invention discloses differing embodiments of methods, aircraft, and apparatus for determining the landing conditions of a runway. In one embodiment, braking data may be collected from an aircraft which has landed on the runway; a braking performance measurement of the aircraft may be calculated based on the braking data; and a normalized braking performance measurement may be determined based on the braking performance measurement. The invention may be utilized to predict the expected braking performance of various types of aircraft on the runway. The invention may provide landing performance information to a broad host of users, and/or may be used as a basis for the development of a new aviation standard for the reporting of runway braking action.

17 Claims, 2 Drawing Sheets

OTHER PUBLICATIONS

European Search Report dated Dec. 20, 2007 in corresponding European Patent Application No. 07252944.9—1248, 5 pages.
*US FAA: Transformation of Air Traffic Control Systems Under Way*, Copyright 2006. The Associated Press. May 2, 2006.
*Tracking System to Better Pinpoint Planes' Locations*, Author: Alan Levin, USA Today; Copyright 2006. May 3, 2006.
*FAA Aims to Deploy 400 ADS-B Stations by 2014*, Author: David Hughes; Aviation Week & Space Technology.

\* cited by examiner

DETERMINATION OF RUNWAY LANDING CONDITIONS

BACKGROUND OF THE INVENTION

There are existing methods and devices for determining aircraft runway landing conditions. Some of these methods and devices rely on pilot perception of current landing conditions. However, pilot perception may be inaccurate and inconsistent. Some of the other methods and devices rely on ground friction measuring vehicles which attempt to predict the runway landing conditions for aircraft. However, these vehicles may provide inconsistent readings when water, slush, or snow is on the runway; they may not measure real-time changing conditions; and their low relative speed to aircraft may not accurately depict the braking performance of landing aircraft at much higher speeds.

One or more of the existing methods and devices may experience problems taking accurate, consistent, quantitative, definitive, reliable, and/or real-time prediction of runway conditions. This may lead to increased cost, decreased safety, lower runway efficiency, lower braking determination consistency and accuracy, and/or other types of problems. A method, apparatus, and aircraft, is needed which may solve one or more problems in one or more of the existing methods and/or devices for determining aircraft runway landing conditions.

SUMMARY OF THE INVENTION

In one aspect of the invention, a method is disclosed for determining the braking conditions of a runway. In one step braking data is collected from an aircraft which has landed on the runway. In another step, a braking performance measurement of the aircraft is calculated based on the braking data. In yet another step, a normalized braking performance measurement is determined based on the braking performance measurement of the aircraft.

In another aspect, the invention discloses a landed aircraft on a runway. During landing of the aircraft, braking data was collected, a braking performance measurement of the aircraft was calculated based on the braking data, and a normalized braking performance measurement was determined based on the braking performance measurement of the aircraft.

In a further aspect of the invention, an apparatus for aircraft is provided. The apparatus collects aircraft braking data, calculates aircraft braking performance measurements, and determines normalized braking performance measurements based on calculated aircraft braking performance measurements.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
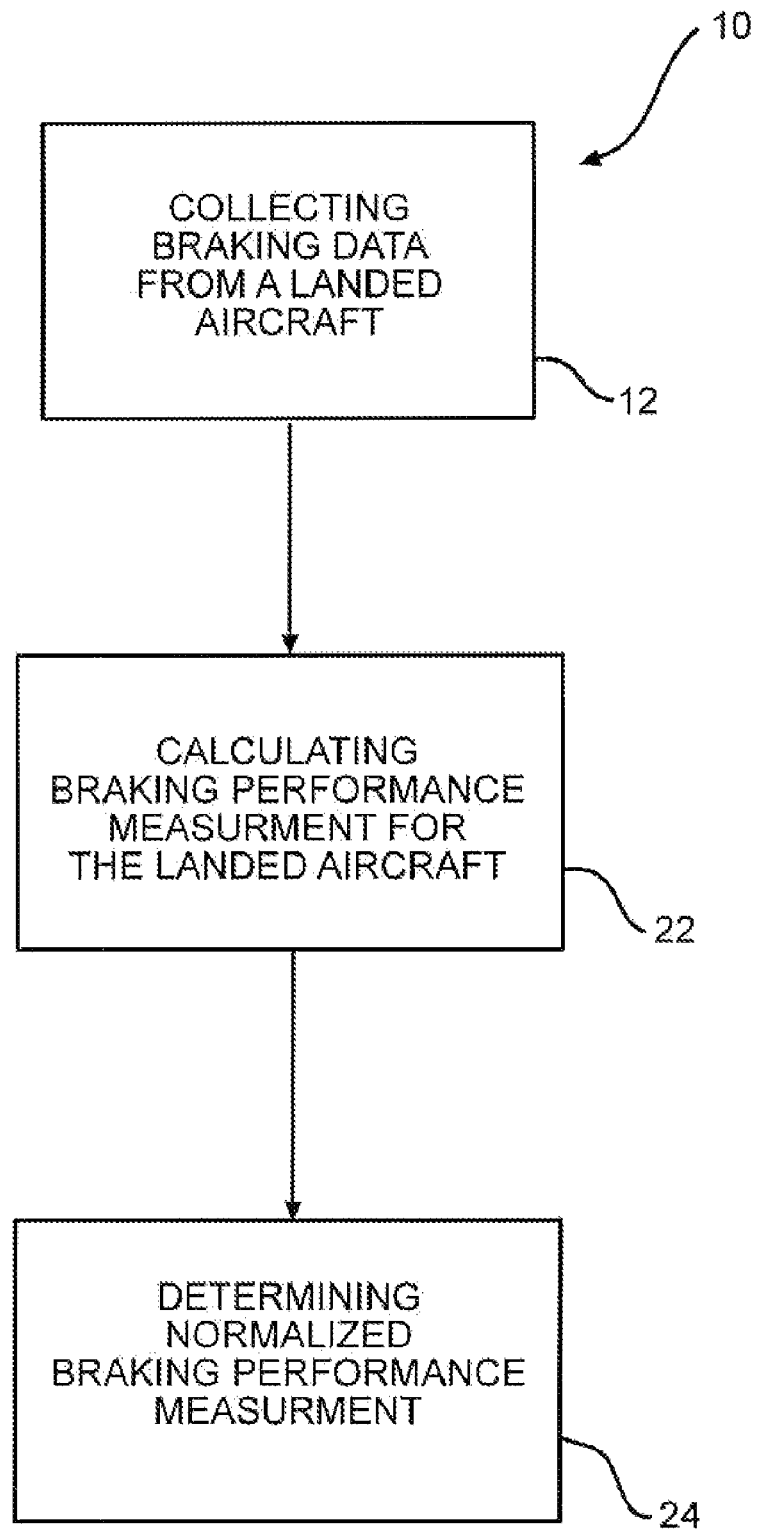
FIG. 1 depicts one embodiment of a method under the invention for determining the braking conditions for a runway.

In one embodiment of the invention, as shown in FIG. 1, a method 10 for determining the braking conditions for a runway is provided. In one step 12, braking data may be collected from an aircraft which has landed on the runway. The braking data may include any data regarding braking of the aircraft on the runway. The aircraft may comprise any type of airplane, or other type of device capable of flying in the air.

Figure 2:
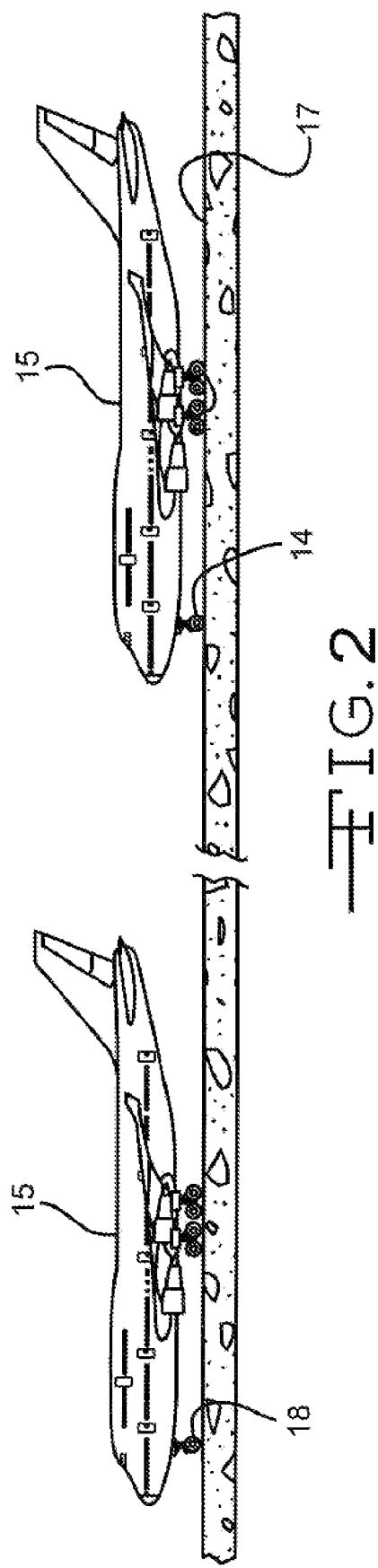
FIG. 2 depicts a perspective view of a landing aircraft in multiple locations as the aircraft touches down and proceeds down a runway.

As shown in FIG. 2, which depicts a landing aircraft 15 in multiple locations as it lands on a runway 17, the collected braking data may comprise an initial touch-down location 14 of the aircraft 15 on the runway 17. The initial touch-down location 14 may comprise the approximate coordinates on the runway 17 where the aircraft 15 first touches down upon landing. The collected braking data may further comprise an initial aircraft velocity of the aircraft 15 at the initial touch-down runway location 14. This initial aircraft velocity may comprise the velocity of the aircraft 15 on the runway 17 when the aircraft first touches down at the initial touch-down location 14.

Additionally, the collected braking data may comprise a final runway location 18 of the aircraft 15. The final runway location 18 may comprise the approximate coordinates on the runway 17 where the aircraft 15 has proceeded down the runway upon landing and reached a velocity where the aircraft 15 is ready to taxi off the runway 17. In another embodiment, the final runway location 18 may comprise the approximate coordinates on the runway 17 where the aircraft 15 has come to a stop and has zero velocity. In yet another embodiment, the final runway location 18 may comprise the approximate coordinates on the runway 17 of a pre-determined location. The pre-determined location may be based in part on the total length of the runway 17, or other criteria.

In addition, the collected braking data may comprise a final velocity of the aircraft 15 at the final runway location 18. The final velocity may comprise the velocity of the aircraft 15 at the final runway location 18. The final velocity may comprise a velocity on the runway 17 when the aircraft 15 has reached a velocity where it is ready to taxi off the runway 17. In another embodiment, the final velocity may comprise a zero velocity when the aircraft 15 has come to a stop. In still another embodiment, the final velocity may comprise the velocity of the aircraft 15 on the runway 17 at the above-referenced pre-determined location.

Referring to FIGS. 1 and 2, in another step 22 of the method 10, a braking performance measurement may be calculated for the landed aircraft 15 based on the collected braking data 12. The braking performance measurement may comprise a measurement of the braking performance of the aircraft on the runway. The step 22 may comprise calculating one or more runway deceleration measurements of the landed aircraft 15. The runway deceleration measurement may comprise the deceleration of the landed aircraft 15 between the initial touch-down location 14 on the runway 17 and the final runway location 18. The deceleration measurement may be calculated by using a mathematical formula similar to the formula Deceleration=$|((\text{Velocity 2})^2-(\text{Velocity 1})^2)/(2*\text{Distance})|$, wherein Velocities 1 and 2 represents the respective velocities of the aircraft 15 at two separate locations along the runway 17, and the Distance represents the distance along the runway 17 between the respective locations where Velocities 1 and 2 are measured. The deceleration measurement may be taken in feet per second squared. In one embodiment, the deceleration may be calculated between the initial touch-down location 14 and the final runway location 18 by using, in the above Deceleration formula, the initial aircraft velocity as Velocity 1, the final aircraft velocity as Velocity 2, and the runway distance between the initial touch-down location 14 and the final runway location 18 as the Distance.

In other embodiments, the deceleration measurement may comprise calculating the deceleration of the aircraft 15 at several different locations along the runway 17. This iteration and calculation may be in the order of twenty times per second. In other embodiments, any number of deceleration measurements may be taken. A graph and/or dynamic display may be prepared to show the variation in deceleration of the aircraft 15 after it touches down 14 until it comes to its final runway location 18. In other embodiments, only one deceleration measurement may be taken. In still other embodiments, the deceleration measurement may be taken along different portions of the runway 17.

Again referring to FIGS. 1 and 2, in yet another step 24 of the method 10, a normalized braking performance measurement may be determined based on the calculated braking performance measurement 22 of the landed aircraft 15. The normalized braking performance measurement may comprise a normalized value of the braking performance measurement. The normalized braking performance measurement may comprise the expected braking performance on the runway 17 of a standard aircraft on a standard day. The term "standard aircraft" may represent a generic, non-descript aircraft of no particular type, while the term "standard day" may represent a day having normal landing conditions. In one embodiment, a standard day may comprise a day where the temperature is 59 degrees Fahrenheit, having a 29.92 Altimeter setting, with no wind, and at sea level. The normalized braking performance measurement may represent a normalization of one or more deceleration rates of the aircraft 15 on the runway 17. The normalized braking performance measurement may comprise an index, coefficient, or value used to represent the expected braking ability of a generalized aircraft on the runway 17.

In determining the normalized braking performance measurement 24, a variety of factors may be taken into account in order to normalize the calculated braking performance measurement 22 to that of a standard aircraft. Some of these factors may include consideration of wind speed, wind direction, weight of the aircraft, type of the aircraft, air temperature, configuration of the aircraft, Minimum Equipment List (MEL) conditions, thrust reverse conditions, non-normal conditions, initial aircraft velocity at the initial touch-down runway location, final aircraft velocity at the final runway location, and/or other factors.

In another embodiment, the method 10 for determining the braking conditions for a runway 17 may further include the step of displaying on the aircraft 15 the braking performance measurement 22 and/or the normalized braking performance measurement 24. This may be displayed on an apparatus on the aircraft 15 such as a computer monitor or other device. The method 10 may further include the step of communicating the braking performance measurement 22 and/or the normalized braking performance measurement 24 to air traffic control and/or other uses of this information—i.e., arriving aircraft, airline dispatch offices, airport operations, military operations, corporate flight departments, departing aircraft, and/or others using braking action reports as an element in making rejected takeoff decisions. This may be accomplished by the pilot radioing air traffic control, or through other means such as data link, Automatic Dependent Surveillance-Broadcast (ADS-B) or other automatic networking communication.

In yet another embodiment, the method 10 may further comprise the step of determining an expected braking performance of a particular type of aircraft on the runway based on the normalized braking performance measurement 24. This may be achieved by taking into account the configuration, weight, and performance capabilities of the particular aircraft. In such manner, the expected braking performance of a whole host of different aircraft may be determined.

In still another embodiment, the method 10 may further comprise the step of preparing, for one or more aircraft, one or more graphs and/or dynamic displays showing at least one of the braking performance measurement 22 and/or the normalized braking performance measurement 24 at particular locations over the runway. These graphs and/or dynamic displays may allow air traffic control to determine the runway deceleration conditions on a continuing time spectrum along various portions of the runway 17 for varying numbers and types of aircraft.

In still another embodiment, the method 10 may additionally comprise the step of assigning a minimum standard sustainable deceleration rate for continued operation of the runway 17 in hazardous weather conditions. The method 10 may further comprise the step of determining whether the runway 17 should be shut down due to hazardous conditions by comparing at least one of the braking performance measurement 22 and the normalized braking performance measurement 24 to the assigned minimum sustainable deceleration rate. If the braking performance measurement 22 and/or the normalized braking performance measurement 24 is below the assigned minimum sustainable deceleration rate for the runway 17, the runway 17 may be shut down until conditions improve.

Any of the above referenced steps for any of the disclosed embodiments of method 10 may utilize one or more apparatus located on the aircraft 15. Such aircraft apparatus may comprise one or more computers, aircraft auto-braking apparatus, or other types of devices.

In another embodiment, the invention may comprise a landed aircraft on a runway. During landing of the aircraft, braking data may have been collected, a braking performance measurement may have been calculated based on the braking data, and a normalized braking performance measurement may have been determined based on the braking performance measurement. Any of the embodiments disclosed herein may have been utilized during landing of the aircraft to collect the braking data, calculate the braking performance measurement, and determine the normalized braking performance measurement.

In yet another embodiment, the invention may comprise an apparatus for aircraft which collects aircraft braking data, calculates aircraft braking performance measurements, and determines normalized braking performance measurements based on calculated aircraft braking performance measurements. Such aircraft apparatus may comprise one or more computers, an aircraft auto-braking apparatus, or other type of device. Any of the embodiments disclosed herein may be used as part of the apparatus to collect the aircraft braking data, calculate the aircraft braking performance measurement, and determine the normalized braking performance measurement.

One or more embodiments of the disclosed invention may solve one or more problems in existing methods, aircraft, and apparatus for determining the landing conditions of a runway. One or more embodiments of the invention may provide a substantially real-time, quantitative, definitive, reliable measure of runway landing conditions in such manner, the invention may decrease cost, increase safety, increase runway efficiency, increase braking determination consistency and accuracy, and/or address other problems known in the art. For instance, the invention may aid in the determination of runway/airport plowing and closure decisions, may aid in rejected takeoff decisions, may aid in airline dispatch, may aid in flight crew divert decisions, and/or may aid in other problem areas.

It should be understood, of course, that the foregoing relates to exemplary embodiments of the invention and that modifications may be made without departing from the spirit and scope of the invention as set forth in the following claims.

We claim:

1. A method for determining a real-time and expected braking conditions for aircraft landing on a runway comprising:

collecting real-time braking data from aircraft landing on the runway using apparatus on the aircraft comprising at least one computer, wherein the braking data comprises initial touch-down runway locations of the landing aircraft, initial aircraft velocities at the initial touch-down runway locations, final runway locations of the aircraft, and final aircraft velocities at the final runway locations;

calculating real-time braking performance measurements of the aircraft based on said real-time braking data using said apparatus, wherein the real-time braking performance measurements comprise real-time runway deceleration measurements of the landing aircraft;

determining real-time normalized braking performance measurements based on said real-time braking performance measurements of said aircraft using said apparatus, wherein the real-time normalized braking performance measurements comprise expected braking performances of standard aircraft landing on said runway taking into account at least one of wind speed, wind direction, weights of the aircraft, types of the aircraft, air temperature, configurations of the aircraft, Minimum Equipment List conditions, thrust reverse conditions, non-normal conditions, the initial aircraft velocities at the initial touch-down runway locations, and the final aircraft velocities at the final runway locations;

displaying in real-time at least one of said real-time braking performance measurements and said real-time normalized braking performance measurements to at least one of air traffic control and other aircraft in order to evaluate braking conditions in real-time; and determining in real-time expected braking performances for different types of aircraft landing on the runway based on said real-time normalized braking performance measurements.

2. The method of claim 1 wherein the displaying in real-time step comprises displaying to said other aircraft at least one of said real-time braking performance measurements and said real-time normalized braking performance measurements.

3. The method of claim 1 wherein said final runway locations comprise at least one of locations where said aircraft are ready to taxi off said runway, pre-determined locations on said runway, and locations where said aircraft are stopped.

4. The method of claim 3 wherein said pre-determined locations on said runway are based, at least in part, on a length of said runway.

5. The method of claim 1 wherein the method utilizes aircraft auto-braking apparatus.

6. The method of claim 1 wherein said normalized braking performance measurements comprise the normalization of the real-time deceleration measurements of the landing aircraft for determining the expected braking performances of the standard aircraft landing on said runway in terms of deceleration rates.

7. The method of claim 1 wherein said standard aircraft represent generic, non-descript aircraft.

8. The method of claim 1 wherein said normalized braking performance measurements represent the expected braking performances of the standard aircraft landing on a standard day on said runway.

9. The method of claim 8 wherein said standard day represents a day with normal landing conditions.

10. The method of claim 1 further comprising the step of preparing a dynamic display showing at least one of said real-time braking performance measurements and said real-time normalized braking performance measurements at particular locations over the runway.

11. The method of claim 10 wherein the dynamic display shows, for different types of landing aircraft, at least one of said real-time braking performance measurements and said real-time normalized braking performance measurements at said particular locations over the runway for each of said different types of aircraft.

12. The method of claim 1 further comprising the step of assigning a minimum standard sustainable deceleration rate for continued operation of said runway in hazardous weather conditions.

13. The method of claim 12 further comprising the step of determining whether the runway should be shut down due to hazardous conditions by comparing at least one of said real-time braking performance measurements and said real-time normalized braking performance measurements to said minimum standard sustainable deceleration rate.

14. Landed aircraft, wherein during the landing of said aircraft on a runway, real-time braking data was collected using apparatus on the aircraft comprising at least one computer, wherein the braking data comprises initial touch-down runway locations of the landed aircraft, initial aircraft velocities at the initial touch-down runway locations, final runway locations of the aircraft, and final aircraft velocities at the final runway locations, wherein real-time braking performance measurements of the aircraft were calculated based on said real-time braking data using said apparatus, wherein the real-time braking performance measurements comprise real-time runway deceleration measurements of the landed aircraft, wherein real-time normalized braking performance measurements were determined based on said real-time braking performance measurements of said landed aircraft using said apparatus, wherein the real-time normalized braking performance measurements comprise expected braking performances of standard aircraft landing on said runway taking into account at least one of wind speed, wind direction, weights of the aircraft, types of the aircraft, air temperature, configurations of the aircraft, Minimum Equipment List conditions, thrust reverse conditions, non-normal conditions, the initial aircraft velocities at the initial touch-down runway locations, and the final aircraft velocities at the final runway locations, wherein at least one of said real-time braking performance measurements and said real-time normalized braking performance measurements were displayed in real-time to at least one of air traffic control and other aircraft in order to evaluate braking conditions in real-time, and wherein real-time expected braking performances for different types of aircraft were determined based on the real-time normalized braking performance measurements.

15. The landed aircraft of claim 14 wherein said landed aircraft have aircraft auto-braking apparatus.

16. Computer apparatus for aircraft, the computer apparatus for collecting real-time aircraft braking data for aircraft as they land on a runway, wherein the braking data comprises initial touch-down runway locations of the landing aircraft, initial aircraft velocities at the initial touch-down runway locations, final runway locations of the aircraft, and final aircraft velocities at the final runway locations, the computer apparatus for calculating real-time aircraft braking performance measurements of the landing aircraft based on said real-time braking data, wherein the real-time braking performance measurements comprise real-time runway deceleration measurements of the landing aircraft, the computer apparatus for determining real-time normalized braking performance measurements based on said calculated real-time aircraft braking performance measurements of said landing aircraft, wherein the real-time normalized braking performance measurements comprise expected braking performances of standard aircraft landing on said runway taking into account at least one of wind speed, wind direction, weights of the aircraft, types of the aircraft, air temperature, configurations of the aircraft, Minimum Equipment List conditions, thrust reverse conditions, non-normal conditions, the initial aircraft velocities at the initial touch-down runway locations, and the final aircraft velocities at the final runway locations, the computer apparatus for communicating at least one of said calculated real-time aircraft braking performance measurements and said determined real-time normalized braking performance measurements to at least one of air traffic control and other aircraft in order to evaluate real-time braking conditions, and the computer apparatus for determining in real-time expected braking performances for different types of aircraft landing on the runway based on said real-time normalized braking performance measurements.

17. The computer apparatus of claim 16 wherein said computer apparatus utilize aircraft auto-braking apparatus.

\* \* \* \* \*